United States Patent

[11] 3,561,602

| [72] | Inventor | Donald H. Molitor<br>Farmington, Minn. (c/o Samcor, Inc., 836<br>W. 79th St., Bloomington, Minn. 55420) |
|---|---|---|
| [21] | Appl. No. | 784,643 |
| [22] | Filed | Dec. 18, 1968 |
| [45] | Patented | Feb. 9, 1971 |

[54] LIQUID FILTER
8 Claims, 3 Drawing Figs.

[52] U.S. Cl.................................................. 210/266,
210/50, 210/317, 210/335, 210/488, 210/502
[51] Int. Cl......................................................... B01d 25/06,
C02b 1/26
[50] Field of Search............................................ 210/488,
489, 457, 437, 501, 502, 506, 335, 339, 266, 317,
50

[56]                References Cited
              UNITED STATES PATENTS

| 1,253,840 | 1/1918 | Kobelt........................... | 210/50 |
| 2,604,994 | 7/1952 | Vocelka........................ | 210/488X |
| 2,670,081 | 2/1954 | Quinn............................ | 210/266X |
| 2,857,052 | 10/1958 | Searle............................ | 210/335X |
| 3,132,501 | 5/1964 | Jacobs et al. ................. | 210/335X |
| 3,167,506 | 1/1965 | Fackler et al. ................ | 210/50 |
| 3,357,563 | 12/1967 | Sicard ........................... | 210/266X |
| 730,485 | 6/1903 | Simoneton .................... | 210/488X |
| 2,738,105 | 3/1956 | Wolfer et al. ................. | 210/488X |
| 2,772,001 | 11/1956 | Bowers.......................... | 210/488X |
| 3,375,931 | 4/1968 | Sorenson....................... | 210/488X |

FOREIGN PATENTS

| 5,857 | 1908 | Great Britain................ | 210/63 |

*Primary Examiner*—Michael Rogers
*Attorney*—Burd, Braddock & Bartz

ABSTRACT: A liquid filter having a casing with liquid inlet and outlet and characterized by a filter element comprised of a multitude of absorbent cellulosic cloth discs, such as terry cloth, in compressed stacked face-to-face relation around a tube disposed between the inlet and outlet. The tube is open at one end and closed at the other and perforated along its length. The liquid to be filtered is forced to pass radially between adjacent cloth discs between the perimeters of the discs and the tube. Dissolved iron is removed from water passed through the filter if the cloth discs are saturated with potassium permanganate.

INVENTOR.
DONALD H. MOLITOR

PATENTED FEB 9 1971

INVENTOR.
DONALD H. MOLITOR
BY
*Burd, Braddock & Bartz*

ATTORNEYS

LIQUID FILTER

This invention relates to filters for liquids and particularly to a filter for removing rust particles, sand, dirt, algae and other suspended impurities from a water supply. Such suspended impurities often impart unpleasant turbidity, unpleasant taste and unpleasant odor to water making it distasteful for drinking purposes. Suspended iron in water stains plumbing fixtures, stains clothing being laundered in the water and reduces the brightness of the laundry. The taste of coffee, tea and other beverages made with water may be adversely affected. Although many water filters have been developed through the years, none has been entirely satisfactory. Either they are unduly complex in structure and expensive, or they have been less than completely efficient, or they have interfered with water pressure or with the operation of appliances utilizing water.

It is the object of the present invention to provide a liquid filter of high filtration capacity for removing suspended impurities at low cost. The filter is easily installed, easily removed and easily disassembled for cleaning or replacement of filter elements. It may be used without materially reducing normal water pressure or flow rate and without interfering with the operation of timed appliances such as washing machines, dishwashers, and the like. The filter may be used either in municipal or home water systems and with either hot or cold water.

The invention is illustrated in the accompanying drawings in which the same numerals identify corresponding parts and in which.

Figure 1:
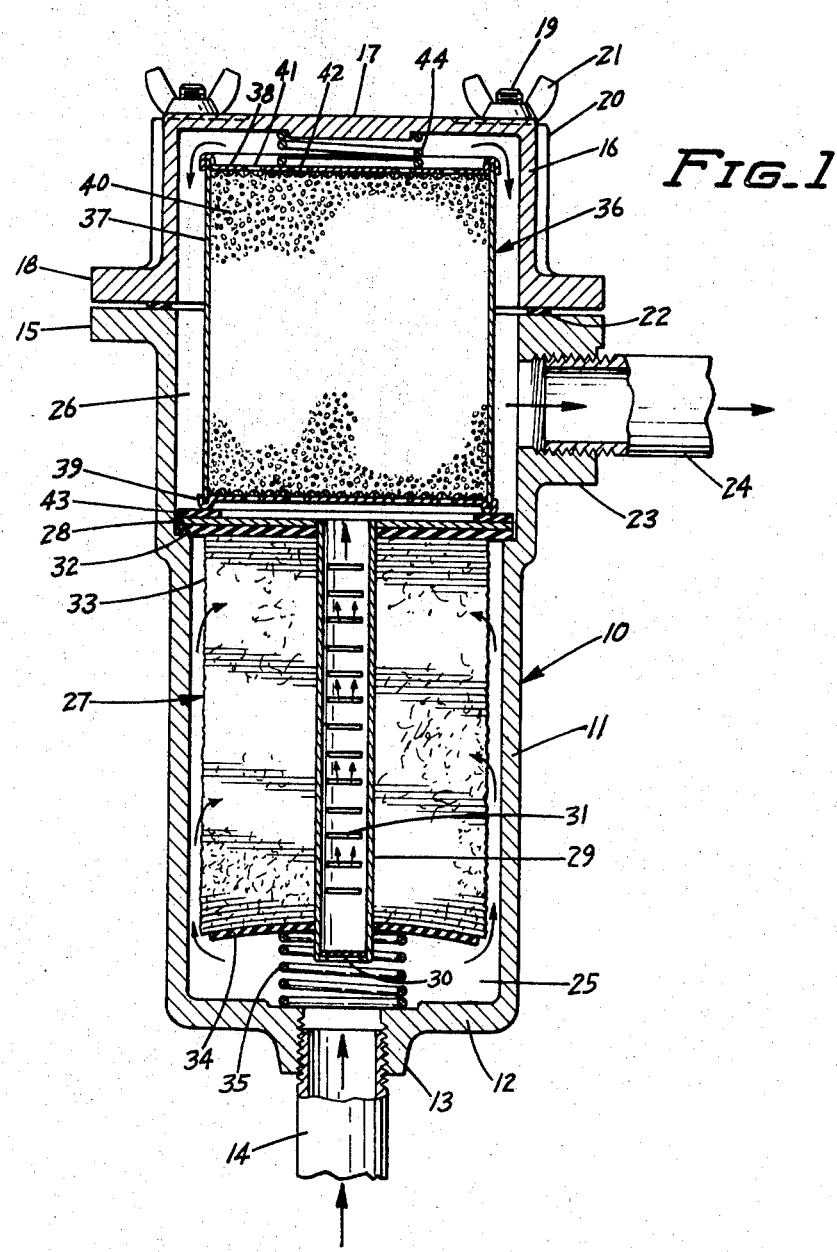
FIG. 1 is a vertical section through the filter.
Figure 2:
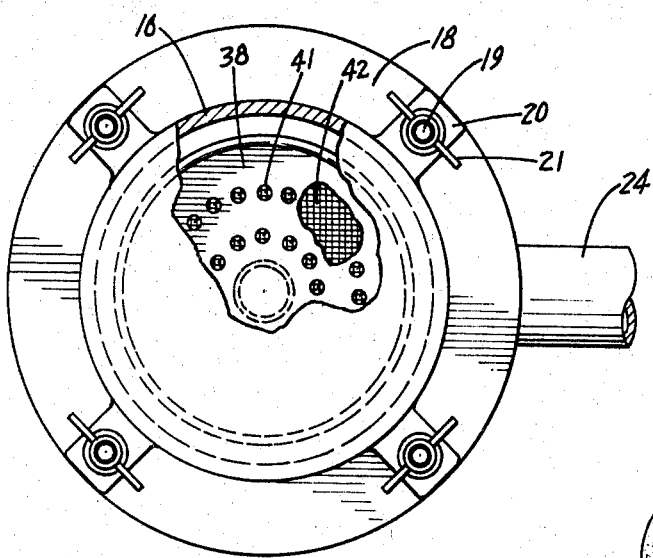
FIG. 2 is a top plan view of the filter, partly broken away to show interior construction.

Referring now to the drawings, and particularly to FIGS. 1 and 2, there is shown a filter unit, indicated generally at 10, comprised of a lower hollow cylindrical filter casing or housing segment 11 having a closed bottom 12, having an internally threaded inlet fitting 13 for connection of the filter unit to a liquid supply pipe 14. The top portion of casing segment 11 is open, having an outwardly extending flange 15. An upper casing segment or cap 16 having a closed top wall 17 and open lower end with outwardly extending flanges 18, rests upon the top of the lower casing segment 11 with the flanges in abutment. The lower casing 11 and cap 12 are secured together for easy assembly and disassembly, as by means of a plurality of bolts 19 extending from the top of the lower casing segment through outwardly projecting ribs 20 spaced around the cap 16 and provided with wing nuts 21. A ring gasket 22 disposed between the abutting flanges 15 and 18 insures a liquid tight fit when the wing nuts 21 are tightened on bolts 19. An internally threaded liquid discharge fitting 23 is provided in the upper portion of the casing 11 for connection of the filter to a distribution pipe 24 for carrying the filtered water to a faucet or an appliance such as a washing machine or the like.

The filter casing has a lower cylindrical chamber 25 and an upper cylindrical chamber 26 of slightly larger diameter. A filter element, indicated generally at 27, is disposed in the lower chamber 25. Filter element 25 comprises a rigid disc or plate 28 having a central opening in which is fitted a tube 29 in liquid tight relation. Tube 29 is closed by a bottom wall 30, is open at its upper end and is provided with a plurality of small openings for passage of liquid, such as slots 31. Disc 28 is of slightly larger diameter than chamber 25 so that it fits with a loose slide fit in upper chamber 26 so as to rest on the shoulder formed at the bottom of the upper chamber. A disc 32 of rubber of the same diameter as disc 28 is provided to insure a liquid tight seal between the upper and lower chambers around their perimeters when the disc is pressed against the shoulder.

Figure 3:
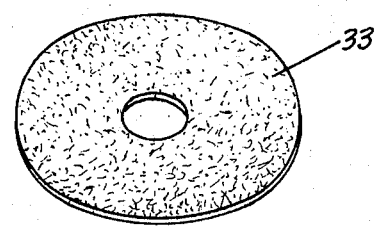
FIG. 3 is a perspective view of one filter disc comprising the filter element.

The tube 29 functions in part as a spindle on which are mounted a plurality of discs 33 in stacked face-to-face relation. Filter discs 33 are formed from absorbent cellulosic cloth, such as cotton terry cloth or turkish toweling characterized by having a myriad of absorbent loops formed on the surface on one side, or preferably both sides. These cloth discs are stacked on one another with the loops of one disc at least partially being pressed between the loops of the next adjacent disc. Alternatively, the discs may be formed from cellulosic fibers bonded into a nonwoven mat. The discs are tightly packed with about 15 to 20 cloth discs per inch of tube. As best seen in FIG. 3, discs 33, apart from the central opening and the porosity of the fabric, are imperforate, that is, they have no cutouts or openings which form water flow passages. As seen in FIG. 1 the discs engage the spindle tube with a close slide fit.

A resilient rubber pressure and diverter plate 34 is disposed in liquid tight sealing relation around the closed bottommost end of tube 29 overlying the lowermost of the cloth discs. The cloth discs and pressure plate are all of diameter slightly less than that of chamber 25 so as to provide an annular liquid flow space around the periphery of the filter element. A coil spring 35 between the inside bottom wall 12 of the casing and the pressure plate 34 aids in maintaining continuous pressure to ensure that the cloth discs remain pressed together. At the same time the stacked discs are free to separate slightly as the outer perimeters become filled with larger particles to permit continuing filter action in the interior areas.

A secondary filter comprising a canister 36 of activated charcoal is disposed in the upper chamber 26. Canister 36 comprises a tubular cylindrical wall 37, top and bottom end plates 38 and 39 secured to the ends thereof to contain a mass of charcoal granules 40. The end plates 38 and 39 are provided with a plurality of perforations 41. A fine mesh cloth or screen 42 is provided over the perforations to retain the charcoal granules within the canister while permitting flow of liquid therethrough. A resilient ring gasket 43 is disposed between the bead by which bottom end plate 39 is attached to the cylindrical wall 37 of the charcoal canister 36 to provide a liquid tight seal.

A coil spring 44 is desirably provided between the top wall 38 of the canister and the inside of the top wall 17 of the casing cap 16 in order to urge the bottom end of the canister into tight sealing relation with gasket 43 and in order to urge the resilient disc 32 of the filter element into tight sealing relation with the shoulder between the chambers 25 and 26. The force exerted by spring 44 must be greater than that exerted by spring 35 to ensure against passage of liquid from the lower chamber to the upper other than through tube 29.

In operation, a liquid such as water under pressure flows from an inlet pipe 14 through the inlet fitting 13 into the bottom of chamber 25. Because of the diverter plate 34 and the closed end 30 of tube 29, the only flow path for the water is outward to the annular space surrounding the filter element 27. Because of the seal formed by resilient disc 32 at the shoulder between chambers 25 and 26, the only flow path for the liquid is inwardly between and through the cloth filter discs 33 and thence through slots 21 into tube 29.

In the course of its travel through and between the cloth discs, the liquid is forced to follow a circuitous path around the fibers and through the spaces therebetween. In the course of this path, at least the larger suspended particles are left behind.

Although not desiring to be bound by any particular theory, it is believed that most of the finer particles are retained in the filter as a result of the absorbent fibers taking up water. The filter initially performs a mechanical filtering function in holding back the larger particles. Then the fibers become saturated with the partially filtered water. As the fibers are forced to give up water due to the continuing influx of water from the supply source, that water which is released is purified, the remaining contaminants being retained by the fibers. The absorbent cellulosic fibers preferentially absorb the contaminated water and preferentially release purified water.

The clear water then travels under pressure up through tube 29 through disc 28 to the space below canister 36. Because of the liquid tight seal between the bottom bead of the canister and gasket 43, the only flow path available for the water is through the perforations in the bottom plate 39 of the canister. As is known, activated charcoal has a high adsorption rate for undesirable tastes and odors. In the course of its passage through the secondary filter canister, the water is further purified. The purified water passes out through the perforations 41 in the top end plate 38 of the canister into the space between the top of the canister and the inside top wall 17 of the casing. The water then flows into the annular space around the outside of the canister 36 and out through the discharge port 23 to the distribution pipe 24.

The filter provides high filtration capacity at lowest possible cost. The filter element composed of the multitude of cloth filter discs provides millions of fiber traps to catch the suspended particles of rust, sand, dirt, algae and other suspended impurities. After the filter element has been filled with impurities, the unit is easily disassembled for removal of the filter element for cleaning and reuse or replacement. Normal water pressure is maintained with no material reduction of flow rate to interfere with the operation of timed appliances. Because the unit contains no heat sensitive materials, it may be used with either hot or cold water. It may be used in conjunction with water softeners and similar water conditioning appliances.

It has been discovered that dissolved iron may be removed from water passed through the filter units according to the present invention if the absorbent cloth discs 33 are saturated with potassium permanganate prior to assembly of the filter unit. The discs are soaked in an aqueous solution of potassium permanganate in concentration between about 5 percent and 10 percent by weight. The discs are removed from the solution and dried immediately and then assembled in compressed stacked face-to-face relation in a filter element, as previously described. It has been found that a filter unit so pretreated with potassium permanganate effectively removes dissolved iron, along with suspended iron and other impurities, from even the rustiest water.

When the potassium permanganate supply in the filter becomes exhausted, the filter element may be replaced with a new element in which the discs have been impregnated with potassium permanganate as described. The unit may be disassembled and the discs washed to free them from collected impurities and then reimpregnated with potassium permanganate solution, dried and reassembled. Alternatively, and preferably, a high concentration of potassium permanganate is maintained in the cloth disc filter element by adding to the filter element an amount of potassium permanganate at least equal to the concentration of dissolved iron in the water supply being filtered. Dissolved iron present in amounts as little as 0.7 parts per million will cause staining of plumbing fixtures. Dissolved iron concentrations as high as 30 to 35 parts per million or more are present in some water supplies. The potassium permanganate in the primary filter is depleted at a rate about equal on a parts basis to the dissolved iron in the water supply. The initial high concentration can be maintained by continuously metering into the primary filter chamber a small amount of potassium permanganate solution proportionate to the total volume of water passing through the filter unit and the proportion of dissolved iron in the water supply. The potassium permanganate is replenished at about the rate it is used up. Commercially available metering equipment can be used for this purpose.

I claim:

1. A liquid filter comprising:
   A. a casing including at least two chambers;
   B. a liquid inlet extending into one of said chambers and a liquid outlet extending from another of said chambers;
   C. a tube centrally disposed within one of the chambers of said casing in the liquid flow path between said inlet and outlet;
   D. said tube being open on one end, closed on the other end and having a plurality of passages for movement of liquid therethrough spaced between said ends;
   E. a diverter plate within said casing secured in liquid tight relation to said tube adjacent its closed end;
   F. a plurality of absorbent cellulosic cloth discs disposed about said tube between said diverter plate and open tube end in compressed stacked face-to-face relation;
   G. said diverter plate and discs each having cross-sectional areas less than the cross-sectional area of the casing and being spaced from the casing walls to provide a liquid flow passage between the casing walls and perimeters of the plate and discs;
   H. means for maintaining said discs under compression;
   I. further plate means disposed between said chambers in liquid tight relation around their outer perimeters to separate the chambers;
   J. the open end of said tube in one of said chambers extending into said plate means to permit passage of liquid to the next adjacent of said chambers; and
   K. secondary filter means in the next adjacent chamber including a canister of activated charcoal:
      1. said canister comprising a cylindrical housing of diameter less than the chamber in which it is situated to provide a liquid passage between the inside casing wall and the canister,
      2. said canister being closed at opposite ends with perforated end plates, and
      3. one end of said canister being disposed in liquid tight relation with the plate means separating said chambers, whereby liquid flowing from one chamber to the next adjacent chamber is forced through said canister.

2. A filter according to claim 1 further characterized in that said diverter plate is a semirigid rubberlike disc in compressed stacked face-to-face relation with the outermost cloth disc adjacent the closed end of said tube.

3. A filter according to claim 2 further characterized in that said means for maintaining said cloth discs under compression includes at least one coil spring disposed between the casing wall and the diverter plate and around the closed end of said tube.

4. A filter according to claim 1 further characterized in that a coil spring is disposed between the end plate of said canister and the inside casing wall to maintain the opposite end of said canister in liquid tight relation with the plate means dividing the chambers.

5. A filter according to claim 1, further characterized in that said filter discs are composed of cotton terry cloth.

6. A filter according to claim 5 further characterized in that said compressed cloth discs are present along said tube in number between about 15 and 20 per linear inch.

7. A filter according to claim 1 further characterized in that said casing comprises:
   A. a hollow cylindrical casting open at one end and a complementary cover over said open end;
   B. sealing means are present between the casing segments to insure a liquid tight seal; and
   C. manually removable securing means are provided to hold said segments together for easy assembly and disassembly.

8. A filter according to claim 1 further characterized in that said cloth discs are impregnated with potassium permanganate.